United States Patent
Kummer et al.

(10) Patent No.: US 11,416,031 B2
(45) Date of Patent: Aug. 16, 2022

(54) MOBILE DEVICE WITH AN EXPANDABLE SCREEN

(71) Applicant: DISH Technologies L.L.C., Englewood, CO (US)

(72) Inventors: David A. Kummer, Parker, CO (US); Danny J. Minnick, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 17/169,489

(22) Filed: Feb. 7, 2021

(65) Prior Publication Data

US 2021/0173445 A1 Jun. 10, 2021

Related U.S. Application Data

(60) Continuation of application No. 16/525,007, filed on Jul. 29, 2019, now abandoned, which is a (Continued)

(51) Int. Cl.
*G06F 1/16* (2006.01)
*H04M 1/02* (2006.01)

(52) U.S. Cl.
CPC .......... *G06F 1/1641* (2013.01); *G06F 1/1647* (2013.01); *H04M 1/0235* (2013.01); (Continued)

(58) Field of Classification Search
CPC combination set(s) only.
See application file for complete search history.

(56) References Cited

U.S. PATENT DOCUMENTS 6,297,838 B1 10/2001 Chang et al.
6,297,945 B1 10/2001 Yamamoto et al.
(Continued)

FOREIGN PATENT DOCUMENTS

CN 1774002 A1 5/2006
CN 1949905 A 4/2007
(Continued)

OTHER PUBLICATIONS

EP Application Serial No. 21177589.5, EPC Rule 61(3) Communication, dated Sep. 14, 2021 (rcvd Sep. 30, 2021).
(Continued)

*Primary Examiner* — Robin J Mishler
(74) *Attorney, Agent, or Firm* — Wash Park IP Ltd.; John T Kennedy

(57) ABSTRACT

A mobile device includes a first display portion, a second display portion and a graphics processor. The first display portion is viewable while the second display portion is obscured when the mobile device is in a retracted configuration. Both display portions are viewable when the mobile device is in an expanded configuration. The graphics processor may be coupled to each display portion and configured to generate a first image for display on: the first display portion when the mobile device is in the retracted configuration; at least one of the display portions while the mobile device is in the expanded configuration; and at least one of the display portions while the mobile device transitions between the retracted configuration and the expanded configuration. The second display portion may be a flexible display material, such as an OLED display and with the first display portion may be a single sheet OLED display.

11 Claims, 9 Drawing Sheets

Related U.S. Application Data continuation of application No. 15/895,866, filed on Feb. 13, 2018, now Pat. No. 10,409,330, which is a division of application No. 13/461,469, filed on May 1, 2012, now Pat. No. 9,927,839.

(60) Provisional application No. 61/482,138, filed on May 3, 2011.

(52) U.S. Cl.
CPC . *G09G 2340/04* (2013.01); *G09G 2340/0407* (2013.01); *G09G 2340/0414* (2013.01); *G09G 2340/0421* (2013.01); *H04M 1/0216* (2013.01); *H04M 1/0247* (2013.01); *H04M 2250/16* (2013.01)

(56) References Cited

U.S. PATENT DOCUMENTS

| | | | |
|---|---|---|---|
| 6,850,780 | B1 | 2/2005 | Gioscia et al. |
| 6,859,219 | B1 | 2/2005 | Sall |
| 7,095,387 | B2* | 8/2006 | Lee .................. G06F 1/1652 345/1.3 |
| 7,953,462 | B2* | 5/2011 | Harry ................ G06F 3/0412 455/575.1 |
| 8,369,075 | B2 | 2/2013 | Huang |
| 8,384,615 | B2 | 2/2013 | Tan et al. |
| 8,659,503 | B2 | 2/2014 | Kee et al. |
| 8,866,840 | B2 | 10/2014 | Dahl et al. |
| 8,873,225 | B2 | 10/2014 | Huitema et al. |
| 8,964,365 | B2 | 2/2015 | Kim |
| 2002/0021258 | A1 | 2/2002 | Koenig |
| 2003/0109286 | A1* | 6/2003 | Hack .................. H04M 1/0266 455/566 |
| 2006/0097631 | A1 | 5/2006 | Lee |
| 2006/0125784 | A1 | 6/2006 | Jang et al. |
| 2006/0240874 | A1 | 10/2006 | Yiu |
| 2008/0194299 | A1 | 8/2008 | Cho et al. |
| 2009/0009423 | A1 | 1/2009 | Huang et al. |
| 2009/0051530 | A1 | 2/2009 | Brooks et al. |
| 2009/0051830 | A1* | 2/2009 | Matsushita ........... G06F 1/1652 361/679.05 |
| 2009/0102744 | A1 | 4/2009 | Ram |
| 2009/0189829 | A1 | 7/2009 | Hiramatsu et al. |
| 2010/0007603 | A1 | 1/2010 | Kirkup |
| 2010/0060587 | A1 | 3/2010 | Freund |
| 2010/0259463 | A1 | 10/2010 | Sip et al. |
| 2010/0273531 | A1 | 10/2010 | Hu |
| 2011/0007465 | A1 | 1/2011 | Naito |
| 2011/0199361 | A1 | 8/2011 | Shin |
| 2011/0216064 | A1* | 9/2011 | Dahl .................. G06F 1/1677 345/428 |
| 2012/0105428 | A1 | 5/2012 | Fleck et al. |
| 2012/0162049 | A1 | 6/2012 | Aoki et al. |
| 2019/0155492 | A1* | 5/2019 | Woo .................. G09G 3/035 |
| 2021/0105428 | A1* | 4/2021 | Onozawa ............. H04N 5/379 |

FOREIGN PATENT DOCUMENTS

| | | |
|---|---|---|
| CN | 101661372 A | 3/2010 |
| CN | 201440678 U | 4/2010 |
| CN | 201550146 U | 8/2010 |
| EP | 2129085 A1 | 12/2009 |
| EP | 211775895 | 6/2021 |
| JP | 2001237933 A | 8/2001 |
| JP | 2003158573 A | 5/2003 |
| JP | 2007124025 A | 5/2007 |
| JP | 2009164794 A | 7/2009 |
| KR | 20010055072 A | 7/2001 |
| KR | 20050083233 A | 8/2005 |
| KR | 20070109764 A | 11/2007 |
| KR | 1020090041456 A | 4/2009 |
| KR | 20090122601 A | 12/2009 |
| KR | 2010025360 A | 3/2010 |
| KR | 20100027502 A | 3/2010 |
| KR | 2010050319 A | 5/2010 |
| KR | 20110017858 A | 2/2011 |
| KR | 1020110038560 A | 4/2011 |
| KR | 20160018830 A | 2/2016 |
| TW | 251406 U | 11/2004 |
| TW | 264541 U | 5/2005 |
| TW | 254555 I | 5/2006 |
| TW | 377622 M | 4/2010 |
| TW | 201133178 A | 10/2011 |
| WO | 0153919 A2 | 7/2001 |
| WO | 02044878 A1 | 6/2002 |
| WO | 2004028010 A1 | 4/2004 |

OTHER PUBLICATIONS

EP Application Serial No. 21177589.5, Extended European Search Report dated Dec. 16, 2021 (rcvd Dec. 16, 2021).
EP Application Serial No. 21177589.5, Response to EPC Rule 61(3) Communication, dated Oct. 1, 2021.
Indian Application No. 201948017147, Examination Report, dated Mar. 25, 2021.
EP Application Serial No. 18199923.6, Rule 71(3) Acceptance, Feb. 8, 2021.
EP Application Serial No. 18199923.6, Decision to Grant, dated May 28, 2021.
EP Application Serial No. 21177589.5, Divisional Application filed, Jun. 3, 2021.
Ndian Application No. 201948017147, Response to Examination Report, dated Sep. 21, 2021.

* cited by examiner

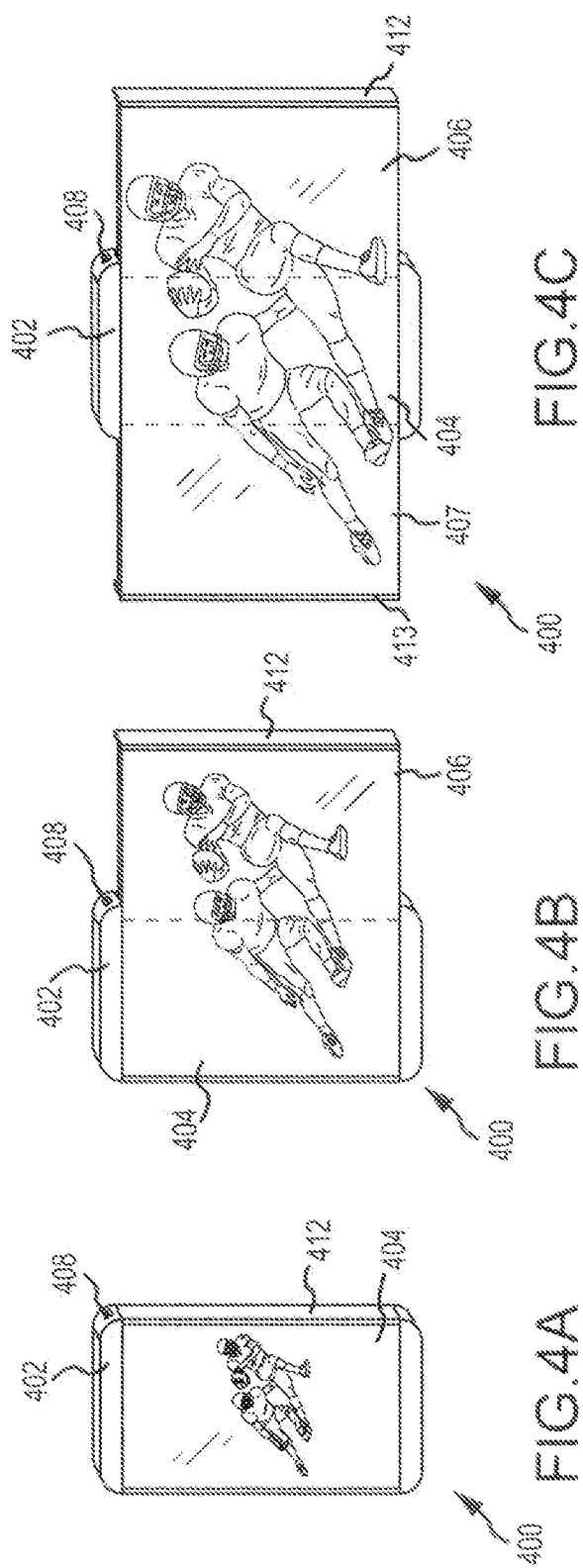

MOBILE DEVICE WITH AN EXPANDABLE SCREEN

CROSS-REFERENCE TO RELATED APPLICATIONS

The present application is a continuation of presently pending U.S. patent application Ser. No. 16/525,007, filed on Jul. 29, 2019 (the "'007 Application"). The '007 Application is a continuation application of U.S. patent application Ser. No. 15/895,866, filed on Feb. 13, 2018 (the "'866 Application"), which issued as U.S. Pat. No. 10,409,330 on Sep. 10, 2019. The '866 Application is a divisional application of U.S. patent application Ser. No. 13/461,469, filed on May 1, 2012 (the "'469 Application"), which issued as U.S. Pat. No. 9,927,839 on Mar. 27, 2018. The '469 Application claims benefit of U.S. Provisional Patent Application Ser. No. 61/482,138, filed on May 3, 2011 (the "'138 Application"). The present application claims priority to each of the '007 Application, the '866 Application, the '469 Application, and the '138 Application and the entire contents of each application are incorporated herein by reference.

The '007 Application is also related to U.S. patent application Ser. No. 15/895,901, filed on Feb. 13, 2018 (the "'901 Application"), which issued as U.S. Pat. No. 10,317,944 on Jun. 11, 2019, and is also a continuation of the '469 Application.

Each of the above identified related applications is entitled "Communications Device with Extendable Screen" and were filed in the name of inventors David Kummer and Dan Minnick.

BACKGROUND

Electronic display technologies have evolved significantly since their inception decades ago. Cathode-ray-tubes have largely become obsolete as plasma displays, liquid crystal displays (LCDs), and light emitting diode (LED)-based displays have become more commonplace. These new technologies have allowed for increasingly thinner and lighter displays, thereby allowing for the creation of devices that are increasingly portable that still provide a quality, high resolution display.

Regardless of the display technologies used, there is tension in the design of portable electronic devices between providing larger, higher resolution screens and making devices more portable. As an example, tablet computing devices such as the APPLE® IPAD® are in high demand largely because they offer significant computing power coupled with a relatively large, high-resolution screen in a device that is much more portable than a laptop or even a net-book. Although tablet-sized portable computing devices offer various conveniences and advantages, they are still too bulky to be reasonably carried in a pocket or holster. Thus, a person will generally need a carrying bag if he or she desires to carry a communications device that is larger than a standard smart phone in their everyday affairs. This may not pose a problem to women, who already commonly carry purses that are adequately sized to stash a tablet device. However, American society has not evolved (or devolved, depending on one's perspective) to the point where it is socially acceptable for a man to carry a man-purse—abbreviated as a "murse," or, as Jerry Seinfeld calls it, a "European carry-all"—where he might easily stow a tablet-sized device to take with him wherever he goes. Although a man may carry a backpack or briefcase into some situations without taking a serious hit to his manliness, such accoutrements are limited in their suitability to various every-day scenarios. For example, a man may want to have a portable communications device along at dinner, at a movie, on a date, out on the town with friends, and so forth. Thus, while a woman may readily add a communications device with a larger screen than a smart phone to the list of items she can carry in her purse, to access wherever and whenever she likes, a man currently has few or no socially acceptable, un-awkward options for carrying a tablet into various common situations. This portability inequality is merely one example of the conflict between the screen size of a communication device and its portability.

BRIEF DESCRIPTION OF THE DRAWINGS

FIGS. 4A-C illustrate a communication device with an extendable display, which includes one or more edge segments, according to one on or more embodiments.

DETAILED DESCRIPTION

Figure 1A:
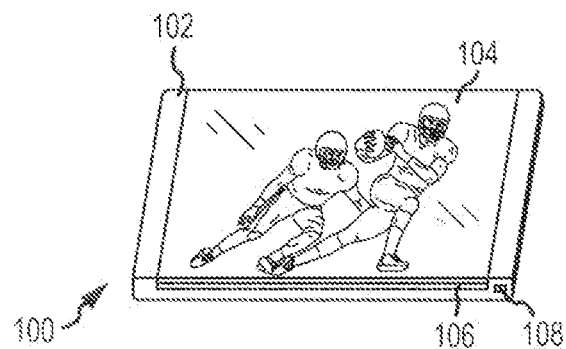
FIGS. 1A-1D illustrate a communication device with an extendable display, according to one or more embodiments.

Described herein are apparatuses and mechanisms for providing an extendable screen in a portable communications device. Per disclosures herein, a portable communications device may be provided with a multi-part screen, a portion of which may be extended to provide an expanded viewing display surface or may be retracted to provide a reduced viewing mode and increased portability. In a reduced viewing mode, a graphical display may be provided on a first, visible portion of a multi-part display screen, where one or more other screen portions are retracted and/or obscured from view in order to provide a portable mode for the communications device. In an extended viewing mode, the one or more other screen portions may be extended and/or brought into the same plane as a first portion of the multi-part display in order to provide increased display size and resolution.

In one embodiment, a portable communications device is provided. The portable communication device includes a communications interface for receiving communications, via a communications network. The device also includes control logic for processing incoming communications, and an input interface for receiving inputs from a user of the device. The device further includes a graphics processor and a display apparatus. The display apparatus comprises a first screen portion, which provides a display of graphical data that is provided by the graphics processor. The display apparatus further includes a second screen portion, which, when the device is in a first mode, is housed inside of the device's housing and is not in an activated state. The second screen portion may be extended from the housing and brought into a position that is coplanar with the first screen portion. In such a position, an edge of the second screen portion may be immediately adjacent to and abutting an edge of the first screen portion. In this position, the second screen portion is brought into an activated state. When the second screen portion is fully extended and brought into the activated state, the graphics processor is operable to provide graphical data to be rendered on both the first and second screen portions. In at least one embodiment, a graphical display region comprised of both the first and second screen portions may be utilized by the processor to provide a single graphical presentation.

In a second embodiment, a portable communications device is provided that includes a first screen portion and a second screen portion. The portable communications device may be placed in a first display configuration wherein the first screen portion is folded on top of the second screen portion such that a first planar surface of the first screen portion abuts an oppositely facing planar surface of the second screen portion, such that only a second planar surface of the first screen portion, which is opposite the first planar surface of the first screen portion, is facing and immediately visible to a user of the communications device. The first screen portion is operable to be unfolded from first display configuration into a second display configuration, wherein the first planar face of the first screen portion and the planar face of the second screen portion are in the same plane and form a single presentation surface.

In the various embodiments described herein, a portable communications device may comprise a portable telephonic device, a tablet device, a portable gaming device, a handheld computing device, and so forth.

FIG. 1A illustrates a portable communications device 100 according to at least one embodiment. The portable communications device 100 of FIG. 1A has a housing 102, which houses various components of the device, including electronic components and circuitry, some of which may be described below with respect to FIG. 8. Housing 102 encases a first screen portion 104 which has a planar display surface facing outwardly from the housing 102. Housing 102 also encases a second screen portion 106, which, in FIG. 1A, is in a retracted position to provide a portable mode of the device and is thus disposed inside of the housing 102. As described below, with respect to FIGS. 1B, 1C and others, second screen portion 106 may be extended from the housing 102 in order to extend the viewing screen, i.e., display area of the communications device 100. In at least one embodiment, portable communications device 100 further includes an optional actuator 108, which may be engaged by a user of the portable communications device 100 in order to extend the second screen portion 106 from the housing 102. In one embodiment, actuator 108 may be depressed or otherwise engaged by a user in order to mechanically cause the second screen portion 106 to be partially extended from the housing 102. Once second screen portion 106 is partially extended, a user may grip some portion of the second screen portion 106—or some member attached thereto—in order to fully extend the second screen portion 106 from the housing 102.

Figure 1B:
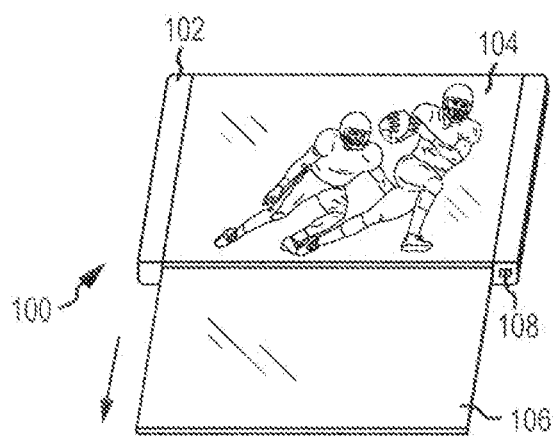

FIG. 1B illustrates the portable communications device 100 according to at least one embodiment. In FIG. 1B, the second screen portion 106 is partially extended from the housing 102. In one example embodiment, a user may have engaged the actuator 108 in order to initiate the extension of the second screen portion 106. Once the second screen portion 106 is partially extended—sufficiently that the user may grip the second screen portion—the user may gently pull the second screen portion 106 in order to extend it from the housing.

In at least one embodiment, extension of the second screen portion 106 may be facilitated by a track and bearing system that may be disposed within the housing. For example, one or more tracks disposed on the backside or edges of the second screen portion 106 may glide in conjunction with one or more ball bearings or rollers disposed within the housing 102 in order to guide the extension of the screen portion 106 and facilitate the screen portion 106 sliding smoothly, evenly, and with minimal effort as it is extended.

Figure 1C:
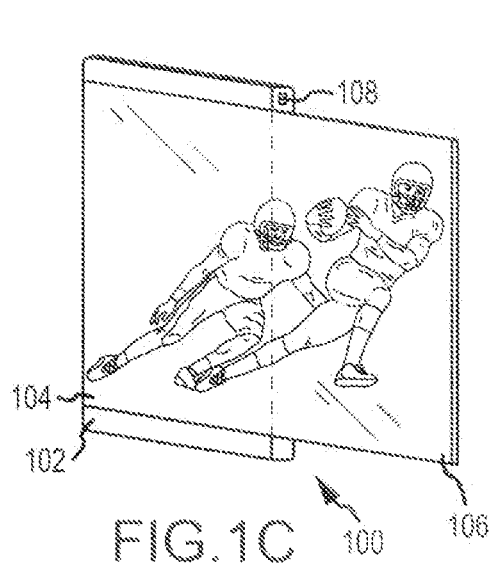

FIG. 1C illustrates the portable communications device 100, where the second screen portion 106 is fully extended. In at least one embodiment, the second screen portion 106, once fully extended, is positioned in the same plane as the first screen portion 104. Whereas in FIGS. 1A and 1B, the second screen portion 106 is below the first screen portion 104 and is therefor not in the same plane as the first screen portion 104, as the second screen portion 106 is moved into a fully extended position, in the embodiment depicted in FIG. 1C, an inner edge (in this depiction, the left edge) of the second screen portion 106 may move slightly past an edge (in this depiction, the right edge) of the first screen portion 104 such that the second screen portion 106 may be moved upwards into the same plane as the first screen portion 104. At this point the edge of the second screen portion 106 may directly abut the edge of the first screen portion 104. With the two screen portions directly abutting each other and in the same plane, the screen portions may form a single display, which has a larger size and greater resolution.

One or more underlying supports or other mechanical devices, such as, for example, a spring, or a portion of the track and bearing system described above, may facilitate the movement of the second screen portion 106 into the same plane as the first screen portion 104 once the second screen portion 106 is fully extended. In one example embodiment, a spring mechanism within the housing 102 may put tension on the second screen portion 106 such that the second screen portion 106 is pushed into the plane of the first screen portion 104 once the inner edge of the second screen portion 106 is clear of the first screen portion 104. Additionally, in some embodiments, one or more structures may be provided on the back side and/or edges of the second screen portion 106, including, for example the track structures described above, which provide support for the second screen portion 106 in an extended position and hold it in place.

Display screen portions 104 and/or 106 may be comprised of various types of display technologies that are available. For example, display screens may consist of either back-lit or edge-lit liquid crystal display (LCD) screens, or light-emitting diode (LED) based screens. In at least one embodiment, the display screen portions may comprise LCD screens that are back-lit and/or edge-lit by LED light sources. In some embodiments, plasma screen technologies may be utilized. In at least one embodiment, organic light emitting diode (OLED) display technologies may be utilized. OLED is a technology in which the electronic structures constituting pixels provide their own light and thus may or may not be backlit. OLED screens are discussed in more detail below.

As depicted in FIG. 1C, when the second display screen portion 106 is fully extended and/or has "snapped" into the same plane as the first display screen portion 104, the first and second display screen portions 104 and 106 may constitute a singular, combined display surface. A graphical presentation that was being provided on the first display screen portion 104 in a portable mode of the communications device 100, as depicted in the example illustrations of FIG. 1A and FIG. 1B, may be expanded or adjusted to be presented on the combined display screen, as depicted in FIG. 1C. In order to utilize the additional screen real estate that is provided when the second display portion 106 is extended, available screen resolution may be expanded to incorporate the additional resolution that is provided by the second display screen portion 106. For example, if a screen resolution of first display screen portion 104 is 320×240, and a screen resolution of the second display screen portion 106 is the same, then when the second display screen is expanded the combined display surface may provide a total resolution of 320×480.

In at least one embodiment, a graphical presentation may be rotated when a combined display surface is created from two or more display screen portions. In the examples depicted in FIGS. 1A-1C, a graphical presentation provided on the combined display surface of FIG. 1C is both enlarged, and rotated 90 degrees from the graphical presentation provided in FIG. 1A. This may be done to provide the best proportions for the graphical presentation that is provided, in relation to the new screen resolution provided by a combined display surface. However, in some embodiments, communications devices may be sensitive to a physical rotational positioning or orientation of the communication device, and images may thus be rotated to be upright, according to the position that a user is holding the device.

Figure 1D:
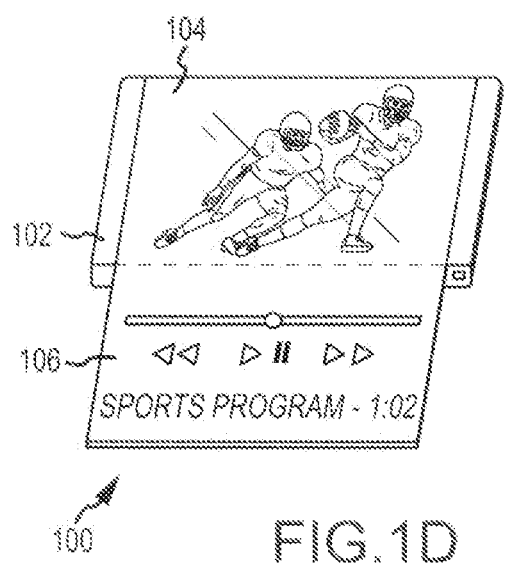

FIG. 1D depicts another embodiment, in which a graphical processor of the communications device provides a different functionality for a combined display surface of first and second display screen portions 104 and 106. In FIG. 1D, rather than the combined display surface providing an expanded graphical presentation as is depicted in FIG. 1C, the example combined display surface represented by FIG. 1D continues to provide a graphical presentation on the first display screen portion 104, while also providing a presentation of additional graphical elements on the second display screen portion 106. In this example, the additional graphical presentation constitutes a set of touch interface controls for controlling an ongoing video presentation. However, virtually any type of graphical presentation could be provided in the second display screen portion 106, which may be related to or unrelated to a concurrently displayed graphical presentation in first screen portion 104.

As depicted in FIG. 1D, in at least one embodiment, one or more display screen portions may be coupled with a touch screen surface to provide touch screen functionality at the mobile device. In one example embodiment, a display layer of the display screen portion 106 may be coupled with a transparent conductive layer, along with capacitance and/or current-change detection technology which detects slight changes in capacitance or electrical current, which occur when as screen portion is touched. Other embodiments of touch screen displays may detect changes in wave reflection, such as a reflection of inaudible sound waves or rays of infrared light.

Figure 2A:
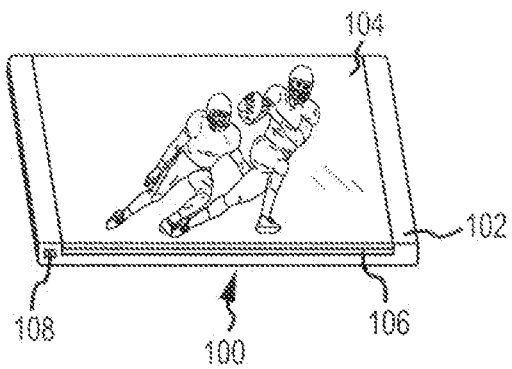
FIGS. 2A-C provides a perspective view of the communication device of FIGS. 1A-D.

FIG. 2A provides a second perspective view of the communications device 100 depicted in FIG. 1A. As depicted in FIG. 2A, communications device 100 includes a housing 102. Housing 102 may encapsulate electronic elements that are contained within the communications device 100 and which are described in more detail below with respect to FIG. 8. Communications device 100 includes a first display screen portion 104 disposed at one surface of the communications device 100. The device 100 also includes a second display screen portion 106 which is in a retracted position, and is fully enclosed within the housing 102, below the first display screen portion 104. In this configuration, all graphical display is provided at the first display screen portion 104 and the device is configured for maximum portability. In at least one embodiment, communications device 100 may include an optional actuator 108 which may be engaged by a user to initiate extension of the second display screen portion 106.

While a button-like actuator 108 is depicted in FIGS. 1A-C, 2A, and various other figures, it is to be understood that virtually any actuator, mechanical interface element, or electronic interface element may be provided which is operable to cause the second display screen portion 106 to be fully or partially extended or to become extendable by a user. The interface element may be positioned anywhere on the communications device 100. For instance, in one example embodiment, a switch may be placed by a user into a first position, which locks the second display screen portion 106 in the retracted position in the housing 102. The switch may be engaged by a user and placed in a second position, wherein a part of the second display screen portion is extended such that the user may fully extend the second display screen portion 106. In another embodiment, a user may interact with an electronic interface element, displayed on the first display screen portion 104, which causes the second display screen portion 106 to be released and/or partially or fully extended from the housing 102. In still another embodiment, an actuator or other mechanical or electronic user interface element may be engaged by a user in order to release a member that is attached to the second display screen portion 106 and which the user may push, pull, or otherwise interact with in order to fully extend the second display screen portion 106. In at least one embodiment, user may extract the second display screen portion 106 without engaging any actuator or user interface element.

Figure 2B:
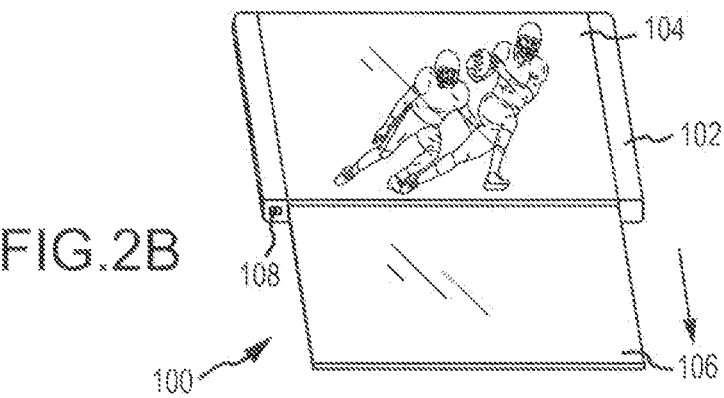

FIG. 2B depicts the communications device 100, in which the second display screen portion 106 is partially extended. As described above, in at least one embodiment, the second display screen portion 106 may be partially extended based on an actuation of the actuator 108 by a user. A user may grip an edge of the second display screen portion 106 in order to fully extend it. In at least one embodiment, display screen portion 106 may have a non-screen edge portion (not depicted) along at least of a portion of the outer edge. This portion may be made of plastic, metal, or another material, and is operable for the user to grip the portion and extend the second display screen portion 106 without, for example, smudging the screen or having to grip a slippery or less durable surface. As described above, the underside or edges of second display screen portion 106 may or may not be coupled to one or more tracks, with corresponding bearings and/or rollers disposed in the housing 102 which provide for the second display screen portion to glide easily to a fully extended position. Alternative mechanisms, for example a roller or ball bearing that rolls directly against the underside surface of second display screen 106 may facilitate a smooth extension of the second display screen portion 106. In at least one embodiment, no mechanism is provided to enhance or smooth the extension of the second display screen portion 106.

Figure 2C:
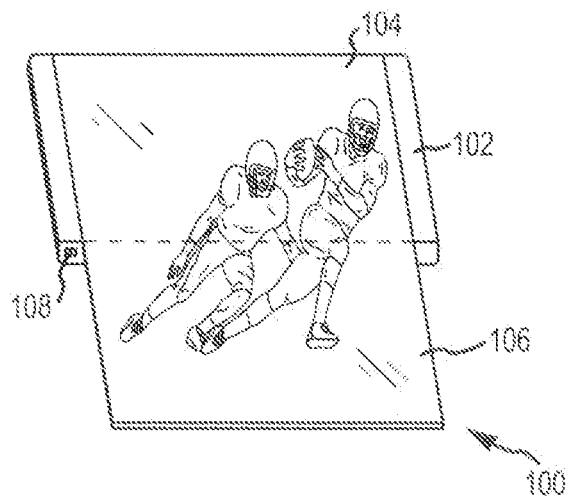

FIG. 2C depicts the communications device 100, in which the second display screen portion 106 is fully extended. When the second display screen portion 106 becomes fully extended it may be shifted vertically in order to come into the same plane as the first display screen portion 104, thus providing a larger, single display screen. As described above, a movement of the second display screen portion 106 such that it is in the same plane as the first screen portion 104 and such that an edge of the second display screen portion directly abuts an edge of the first display screen portion may facilitated through various mechanisms. In one example embodiment, a spring or spring-like mechanism coupled to the housing 102 may exert an upward force on the second display screen portion 106 such that once the second screen portion is fully extended and an interior edge of the second display screen portion 106 is clear of the underside of the first display screen portion 104, the edge is pushed upward. In another embodiment, a user may press lightly upward on the second display screen portion 106 to "snap" the screen portion into place in the same plan as the first display screen portion 104.

As described elsewhere herein and as depicted in FIG. 2C, a graphical presentation that was previously being presented on the first screen portion 104 may be extended to be presented on the combined display screen that is provided by both the first and second display screen portions 104 and 106 once the second display screen portion 106 is fully extended. In various embodiments, an orientation of a graphical presentation provided by the communications device 100 at the combined display screen may be rotated, either automatically or manually. In at least one embodiment, a rotation of the graphical presentation rotation may be effectuated in order to make an improved use of screen space and dimensions and/or to reduce or eliminate skew. In some embodiments, the graphical presentation may be rotated based on the physical orientation of the device 100 with respect to a user.

Figure 3:
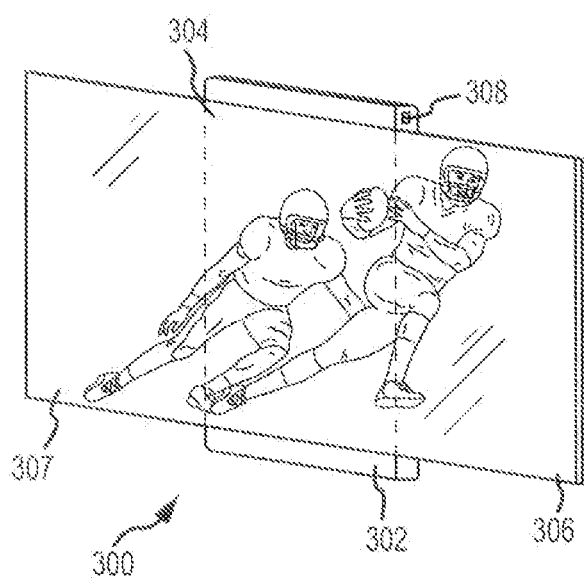
FIG. 3 illustrates a communication device with an extendable display that includes three screen portions, according to one or more embodiments.

FIG. 3 depicts an embodiment of a communications device 300, which may have some similarities to communication device 100 described in FIGS. 1A-1D and FIGS. 2A-2C. The communications device 300 of FIG. 3 includes, in addition to a first display screen portion 304 and second display screen portion 306, a third display screen portion 307. In some embodiments, second screen portion 306 and third display portion 307 may have one or more of the qualities of the second screen portion 106 that are described above. Third screen portion 307 may, in a retracted mode, be housed inside the housing 302 of the communications device 300. In at least one embodiment, the third screen portion 307, when in a retracted mode (not shown), may be disposed below the second screen portion 306, which is in turn disposed below the first screen portion 304. In at least one embodiment, there may be an optional second actuator (obscured from view in FIG. 3) for initiating an extension of the third screen portion 307 from the housing or any other physical or electronic user interface element as described above. The second actuator may be in addition to the first actuator 308, which operates on the second screen 306. In at least one embodiment, a single actuator 308 or other user interface element may be engaged to cause both the second screen portion 306 and third screen portion 307 to be partially or fully extended.

In an embodiment where an actuator or other user interface element is engaged by a user to partially extend third screen portion 307, a user may grip the third screen portion or a member that is connected thereto, in order to fully extend the third screen portion 307. As with the communications device 100 described above, when third screen portion 307 is fully extended, it may be brought into the same plane as the first screen portion 304 and/or the second screen portion 306, in order to provide a single display. As depicted in FIG. 3, a graphical presentation that is provided at the first screen portion 304 and/or the second screen portion 306 may be altered, rotated and/or expanded in order to utilize the additional screen space that is provided by the third screen portion 307 in addition to the first and second screen portions 304 and 306.

FIG. 4A illustrates another embodiment of a communications device: communications device 400. In some embodiments, communications device 400 and its elements may have some of the attributes described above with respect to the communications devices 100 and 300 depicted in previous figures. Similar to communications devices described above, communications device 400 includes a housing 402, a first display screen portion 404, and may include an optional actuator 408. Communications device 400 additionally includes an edge portion 412. Edge portion 412 may be comprised of a metallic, rubberized, or other material, which may or may not be the same material that comprises other external portions of the housing 402. Edge portion 412 may serve to protect the first screen portion 404, other display screen portions, and other elements of the communications device 400 that are housed within the housing 402 from damage in the case of the device being accidentally dropped, from water damage, or from other damage.

FIG. 4B illustrates communications device 400, wherein a second display screen portion 406 has been extended from the housing 402. Second screen portion 406 is attached to the edge portion 412. When in a retracted mode as depicted in FIG. 4A, second screen portion 406 is housed within the housing 402. In at least one embodiment, actuator 408 may be actuated by a user in order to release the edge portion 412. A user may grip the edge portion 412 and extend the second screen portion 406 until it is fully extended. As described above, prior to being fully extended, second screen portion 406 may be disposed below the first screen portion. However, once second screen portion 406 has been fully extended, the second screen portion 406 may move into the same plane as the first screen portion 404, wherein an inner edge of the second screen portion 406, which is opposite the edge portion 412, may directly abut an adjacent edge of the first screen portion 404 in order to provide a single display screen with increased size and resolution.

FIG. 4C shows an embodiment of the communications device 400. In addition to elements described above with respect to FIGS. 4A and 4B, FIG. 4C additionally includes an optional third screen portion 407, which may be extended from the housing 402 for an expanded viewing mode or retracted into the housing 402 for a portable mode. When both second and third screen portions 406 and 407 are placed in retracted positions, one or the other may be disposed in the housing below the first screen portion 404, and the remaining screen portion may be disposed below the other two. Third screen portion 407 is attached to a second edge portion 413, which, similarly to edge portion 412, in some embodiments may be released by an actuator or by other means. In at least one embodiment, second edge portion 413 and/or first edge portion 412 may be extended from the housing 402 without any actuation of an actuator or other release mechanism, but may merely be extended with a proportionate amount of pressure exerted by a user. In one example embodiment, second edge portion 413 may be pushed into a fully retracted position and "click" into place—via a slightly spring loaded extrusion in the housing 402, or by any other mechanism, depending on design preferences—when the device is placed in a portable mode. In such an embodiment, however, a user may exert a minor force in order to overcome the mechanism providing the "clicked in" position and to extend the second edge portion 413 and the corresponding third screen portion 407 from the housing 402.

Similarly to the communications devices described in FIG. 3, when third screen portion 407 is fully extended from the housing 402, it may move into the plane of the first screen portion 404 in order to form a planar surface with first and second screen portions 404 and 406 in order to provide a larger, planar display surface, with correspondingly increased resolution. Similarly to FIG. 3, one or more graphical presentations or images that are presented on the display device may be expanded, oriented and/or rotated in order to utilize the newly available screen resolution that is provided by the extended screen portion(s).

Figure 5A:
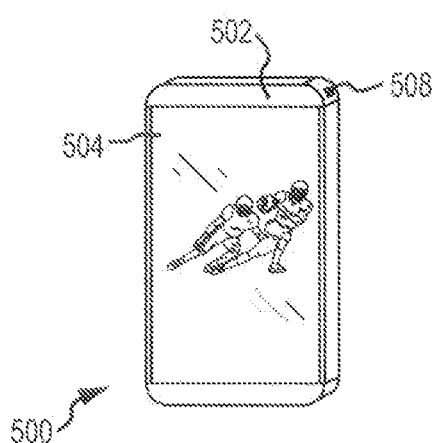
FIGS. 5A-D illustrate a communication device with an extendable display that utilizes a folding mechanism, according to one or more embodiments.

FIG. 5A depicts another embodiment of a communications device 500 with an extensible display screen. Communications device 500 includes a first display screen portion 504, which provides a display of a graphical presentation provided by a graphics processor of the communications device 500. The communications device 500 also includes a housing 502, which houses the electronic components of the device, and an optional actuator 508 that, in at least one embodiment, may operate to fully or partially extend the display screen of the communications device 500, as described below. Housing 502 may include edge portions, which protect the screen 504.

Figure 5B:
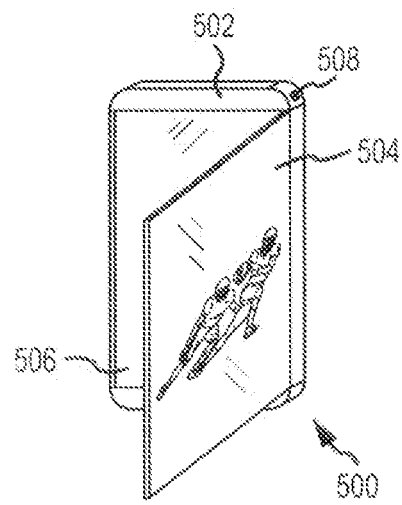

FIG. 5B depicts the communications device 500, where an extension of the display has been initiated. Unlike devices depicted in FIGS. 1A-4C where a second screen portion may be extended from inside the housing 502, in communications device 500 an outermost screen portion—in this case, first screen portion 504—may be folded out from the communications device 500 to reveal a second screen portion 506. The first screen portion 504 may be unfolded—and subsequently refolded—along an axis that forms the boundary between the first and second screen portions 504 and 506. In one embodiment, the folding mechanisms described herein may be accommodated by providing one or more grooves, corrugations or creases in a single sheet of screen material(s), which will form the axis(es) upon which screen portions may be folded or unfolded to extend and retract the display.

In one embodiment, a user may actuate the optional actuator 508 in order to release the front screen portion so that it may be unfolded. Other embodiments may include other mechanisms for releasing the first screen portion in order to unfold it, for example, a switch, a hook, a tab and so forth may be provided. In an additional example embodiment, front screen portion may "click" into place over a slight extrusion or ball bearing provided in the housing 502. The user may engage an actuator or grip an edge of the screen portion or a slightly extruding member attached to the screen portion in order to release and unfold the screen portion. In at least one embodiment, no release or actuator is necessary, and the first screen portion 504 may simply be unfolded by a user.

Figure 5C:
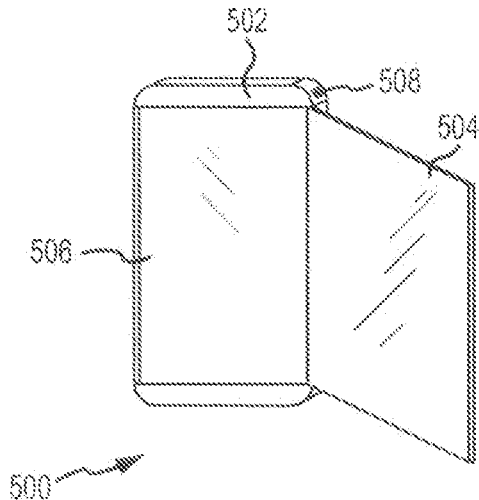
Figure 5D:
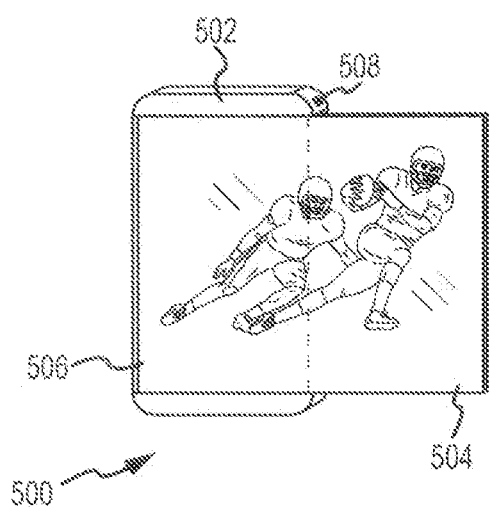

FIG. 5C illustrates the communications device 500, where the first screen portion 504 is unfolded, i.e. extended, further. FIG. 5D illustrates a full extension of the first screen portion 504, such that first and second screen portions 504 and 506 are coplanar and form a single display screen with larger size and, in at least one embodiment, twice the resolution. It is to be noted that in embodiments of communications device 500 that are configured as depicted in FIGS. 5A-5D, FIGS. 6A-6C, and FIGS. 7A-7B, that the first screen portion 504 (or analogue thereto 604 & 704, in the case of FIGS. 6A-6C and 7A-7B) provides a graphical display on both faces of the screen portion, depending on whether the screen portion is in retracted or extended (i.e., folded out). This is demonstrated as FIGS. 5A and 5B are compared with FIG. 5D. As illustrated in FIG. 5A, when communications device 500 is in a portable mode, i.e., first screen portion 504 is folded in and covers second screen portion 506, the outward, visible facing surface of first screen portion 504 provides a display. In some embodiments, as first screen portion 504 is unfolded, as illustrated in FIG. 5B, the screen portion may continue to provide a graphical display on the same surface, or, optionally, the graphical output may be disabled or may be transferred to the opposite surface or to screen portion 506 during unfolding. However, as depicted in FIG. 5D, once the first screen portion 504 is fully extended, the opposite surface of the screen portion now becomes the outward-facing surface and is activated. This surface of the first screen portion 504, in conjunction with second screen portion 506, provides a graphical display for a user.

Thus, in embodiments depicted by FIGS. 5A-D, first screen portion 504 is enabled to provide graphical output on both surfaces, such that the screen portion is operable in both folded (retracted) and unfolded (extended) modes. This dual-sidedness may be accomplished using various display screen technologies. In one example embodiment, the panel that comprises the first screen portion 504 may include two separate LCD or LED panels—one for each surface. In such an embodiment, a first display panel—which faces outward toward a user when the communications device 500 is in a collapsed (i.e., portable) mode as depicted in FIG. 5A—provides graphical output from the communications device 500. Then, when the first display screen is unfolded in order to provide an extended display screen that includes both screen portions 504 and 506, as illustrated in FIG. 5D, the second, opposite facing LCD panel of the first screen portion 504 may be enabled or become operable to provide display on the other surface of the screen portion 504 in order to provide a user with a graphical display in the expanded configuration.

In various embodiments, other technologies besides utilizing two separate LCD or LED panels may be used to provide a display on both surface of the first screen portion 504. In at least one embodiment, a single display panel that provides a display on both sides thereof is utilized for the first screen portion 504. One example embodiment of such a display panel includes a panel that incorporates organic light emitting diode (OLED) technology.

Organic light emitting diode (OLED) displays are a recent generation of display technology which allows for a display to be provided, without backlighting, on a thin sheet of material or film. An OLED consists of an emissive electroluminescent layer, which typically comprises a film of organic compounds that emit light in response to an electronic current. When the materials that make up the emissive electroluminescent layer of the OLED are placed between two electrodes that provide a current through the layer, the organic materials in the layer will emit light. Various light emitting materials and/or pigmented portions may be disposed within the layer in order to create color-displays that can present graphical output, similarly to a traditional LED-based display, LCD, or other display. Because the OLED itself is light emitting, OLED's may be used in some configurations without a backlight. This feature may be combined with transparent or translucent emissive material and/or electrodes, along with other transparent or translucent screen layers, in order to create OLED's that are translucent or even largely transparent. Given that they may be manufactured from polymers, OLED's may be designed to be bendable and even foldable, while still providing their display functionality. Because OLED's may be manufactured to be foldable, they are well suited to embodiments that include folding, such as those depicted in FIGS. 5A-D, FIGS. 6A-C and FIGS. 7A-B. OLED technology has reached the point where it may be used to provide fully functional displays with resolutions that are competitive with other display technologies, but with the advantages of OLED.

Figure 6A:
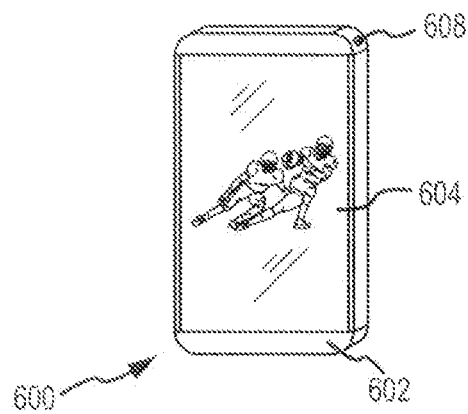
FIGS. 6A-C illustrate a communication device with an extendable display that utilizes a folding mechanism, according to one or more embodiments.
Figure 6B:
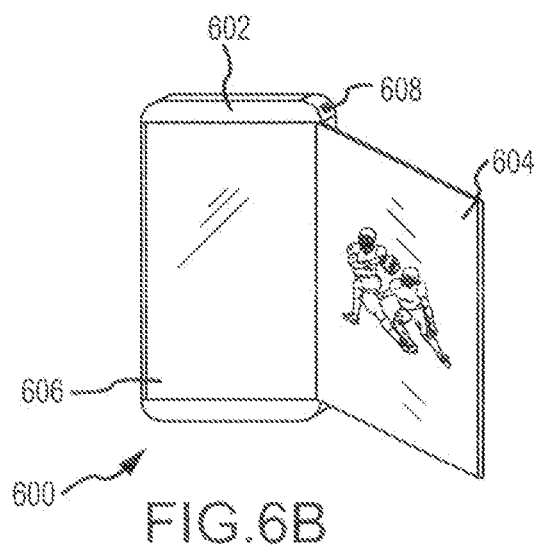
Figure 6C:
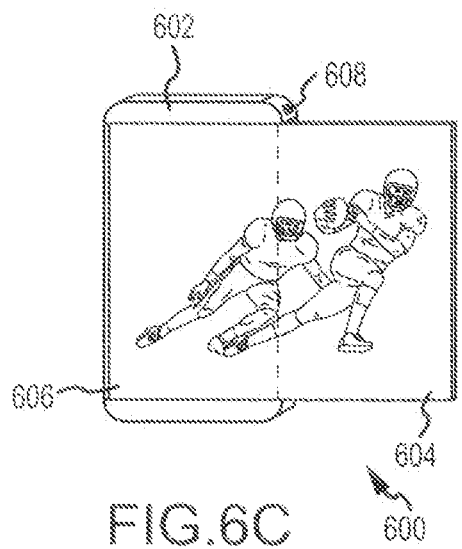

FIGS. 6A-C illustrate an embodiment of a communications device 600, with some similarities to communications device 500. Communications device 600 includes a housing 602 and an optional actuator 608. The embodiments of communications device 600 depicted in FIG. 6A-C include a first display screen portion 604 that comprises an OLED display panel. Other layers of material, such as touch screen layers, may be added to one or more OLED layers to form a display screen panel. As depicted in FIG. 6B, when the OLED display panel of first screen portion 604 is folded out in order to extend the screen, similarly as described above with respect to FIGS. 5A-5D, the graphical presentation depicted on the display panel continues to be visible on the other surface of the display panel. In the example of FIG. 6B, the image appears to be inverted (i.e., a mirror image) given that from the perspective of a user, the image is being viewed from the opposite surface. This is a result of the first screen portion 604 being comprised of an OLED, which can be created on a transparent or translucent sheet of material. Thus, an embodiment that utilizes OLED may utilize a single OLED display screen to present a graphical display on both surfaces of a first screen portion 604.

In order to provide a user with a non-mirror-imaged view of a graphical presentation, hardware and/or software of the communications device 600 detects when the first screen portion 604 has been fully or partially unfolded (i.e., extended). Upon detecting this, an image displayed in the OLED display is inverted, so that it may be properly viewed from a perspective of a user facing the communications device 600, who is now viewing an opposite surface of the first screen portion 604. As depicted in FIG. 6C, and similarly as described for other embodiments above, in addition to be inverted, an image may be expanded and/or rotated in order to present an expanded view and utilize the resolution and screen space that is provided by the extended display, which includes both first screen portion 604 and second screen portion 606. In some embodiments, second screen portion 606 of FIGS. 6B and 6C may be comprised of OLED material or, may be comprised of other display technologies (e.g., LCD) material. In at least one embodiment, first and second screen portions 604 and 606 may be constructed of a single sheet of OLED display screen material.

Figure 7A:
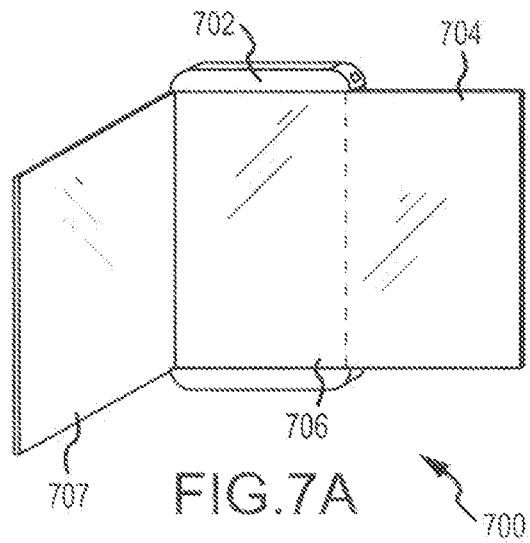
FIGS. 7A-B illustrate a communication device with an extendable display that utilizes a folding mechanism and includes three screen portions, according to one or more embodiments.
Figure 7B:
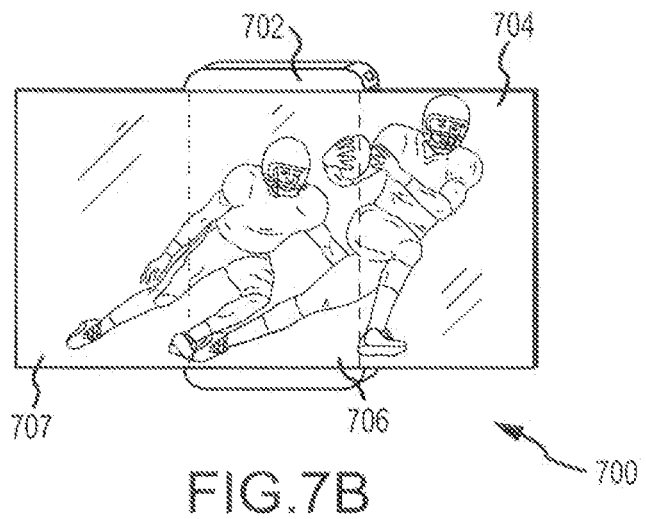

As depicted in FIGS. 7A and 7B, at least one embodiment of a communications device 700 may have a third panel 707 in addition to a first panel 704 and a second panel 706. The panels are encased by the housing 702. When a communications device is in a portable mode (not shown in FIG. 7A or 7B), both the first panel 704 and the third panel 707 are folded inwards. The third panel 707 may be folded directly on top of the second (center) panel 706, and the first panel 704 may be folded on top of the third panel 707 to be the most outward panel. In such a configuration, only the first panel 704, which is the most outward panel, would be visible to a user. The outward-facing surface of the first panel 704 would provide a graphical presentation to the user. In some embodiments, the configuration could be switched, such that third panel 707 is the outward-most panel and provides a display in the portable mode. In at least one embodiment, the device is configured to detect which of the first and third panels is outward facing and provide a display thereon.

As depicted in FIG. 7A, first panel 704 and third panel 707 may be folded out in order to provide a significantly extended display. FIG. 7B depicts the communications device 700, wherein a display has been provided across each of the first, second and third display screen portions (704, 706 and 707) in order to provide a single, extended display with expanded screen space and resolution. The screens depicted in communications device 700 may be OLED screens, as described with respect to FIGS. 6A-C, or may be other types of screens, for example, LCD, as described above.

In FIGS. 5A-D, FIGS. 6A-C, and FIGS. 7A-B, the various screen portions depicted may be comprised of a single display panel sheet, or each screen portion may be an individual display panel sheet, which is attached to one or more of the other screen portions. A display panel sheet may be constituted from various layers of materials, including layers of display materials (such as one or more sheets of LCD, LED, or OLED elements), layers of materials that facilitate touch screen functionality, layers of backlighting materials, protective layers, and so forth. One or more of the layers may be transparent or translucent.

Figure 8:
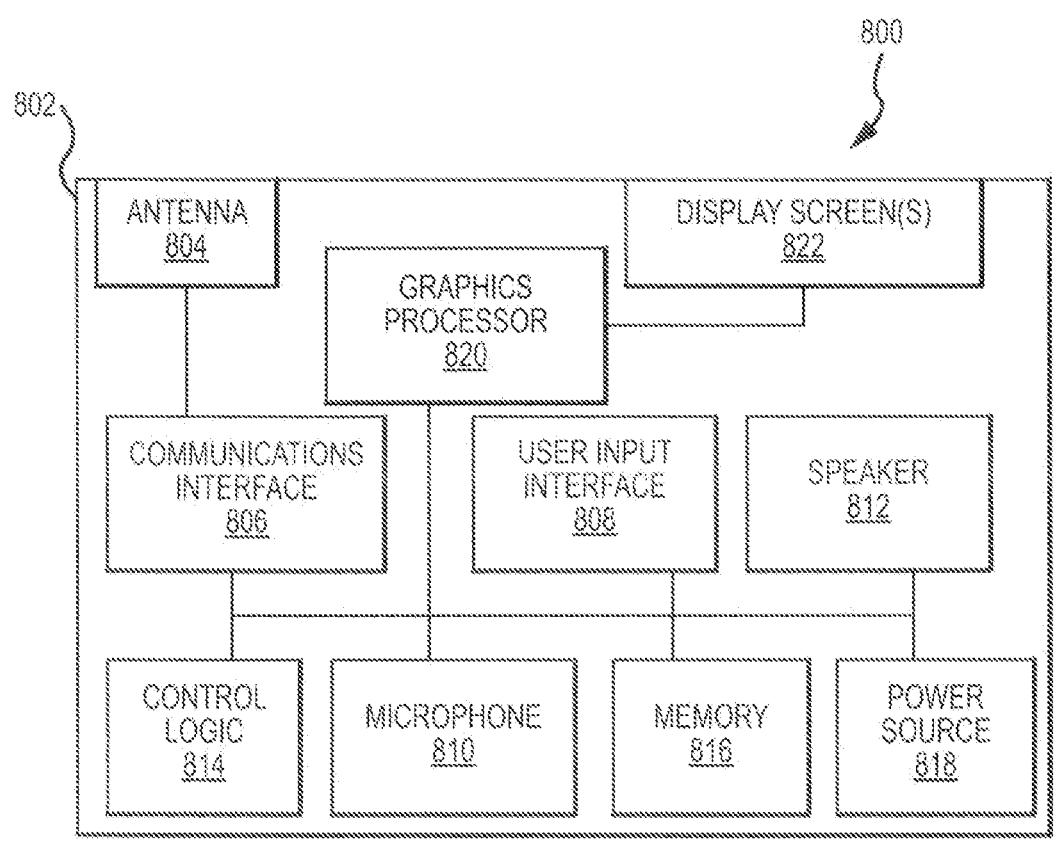
FIG. 8 illustrates a portable communications device and corresponding components, according to one or more embodiments.

FIG. 8 illustrates an embodiment of a portable communication device 800. The communications device 800 may fully or partially represent any communications device (e.g., 100, 300, 400, 500, 600 and 700) described herein. The communication device 800 will be described in reference to a communication network, which the communications device 800 communicates with in order to receive and transmit data from the device. The mobile communication device 800 includes a housing 802, an antenna 804, a communications interface 806, a user input interface 808, a microphone 810, a speaker 812, control logic 814, memory 816, a battery 818, a graphics processor 820, and one or more display screens 822 that may be consistent with the display screens and/or screen portions of the various embodiments described above. Each of these components is discussed in greater detail below. FIG. 8 is an illustration of an embodiment of a communications device 800, and it is understood that the components thereof may be implemented either functionally or logically, as hardware or as software, and may be integrated into consolidated units or separated into multiple units beyond what is depicted in the example embodiment shown in FIG. 8. Further, communications device 800 may include additional components beyond those depicted in FIG. 8. The various components of entertainment device 800 are depicted as being connected via one or more buses or connections. The connections that are depicted in FIG. 8 are merely illustrative; the components of the entertainment device 800 may be connected in any of several configurations using any number of buses or other connections.

The housing 802 is configured to house the various illustrated components. One or more display screens 822 may be coupled to the housing and may be disposed at a surface thereof. As described above, one or more screen portions may be housed within the housing 802 when in a retracted mode and may be extended therefrom in an extended viewing mode. Housing may include additional mechanical elements, such as one or more rollers, bearings and/or tracks that facilitate the extension of the one or more screen portions. Support structures for the screens may also be provided The housing 802 may also be coupled to one or more actuators (not depicted in FIG. 8, but depicted in previous figures) or other user input mechanisms (whether mechanical or electronic) which facilitate a partial or full extension of the one or more extendable screen portions. It will be appreciated that the dimensions of the housing 202 and configuration thereof may vary depending on desired design criteria.

An antenna 804 is disposed within or along an edge of the housing 802. An antenna may be configured to receive and transmit one or more different types of wireless communication signals in order to provide communication between the communications device 800 and one or more communications networks. For example, the antenna may be configured to provide communication with a cellular network, a wireless data network such as a wireless LAN or WAN, or to otherwise provide communications with other devices via various wireless protocols, and so forth. There may be multiple antennas to communicate with different types of networks or a single antenna configured to transmit and receive signals from various types of networks. The communications interface 806, coupled to the antenna 804, may comprise any type of wireless transceiver configured to communicate with one or more communications networks via the antenna 804. The communications interface 806 may utilize any type of wireless communication protocol depending on desired design criteria.

The user input interface 808 is disposed along a surface of the housing 802. The user input interface 808 is configured to receive user input from a user. In at least one embodiment, the input interface 808 includes one or more buttons or keys configured to receive the user input, The user input interface 808 may include other types of man-machine interfaces, including trackballs, rocker switches, touch pads, touch screens and the like. In at least one embodiment, the input interface 808 is configured to receive voice input from the user. In at least one embodiment, the user input interface 808 receives user input from touch screen panels that are integrated with the one or more screen portions described herein.

The microphone 810 is configured to receive voice data from the user 810. The speaker 812 is configured to output audio data to the user 810. The microphone 810 and the speaker 812 may be positioned at appropriate locations within or on the surface of the housing 802. The microphone 810 and/or speaker 812 may be optional in some embodiments. Some embodiments may incorporate additional user input devices, for example, a camera device.

The control logic 814 is operable to control the operation of the communication device 800. The control logic 814 may be a single processing device or a plurality of processing devices that cooperatively operate to control the operation of the communication device 800. In at least one embodiment, the control logic 814 is operable to control telephone communications and/or data operations between the communication device 800 and one or more communications networks and/or remote devices. In at least one embodiment, control logic 814 may execute applications and/or other processors which provide and/or enhance the functionality of the communications device 800. The control logic operates in conjunction with memory 816, which may be volatile and/or non-volatile memory, in order to execute stored programs, store and recall files, and provide processing capabilities for the device.

The communications device 800 includes a power source 818, which may be a battery and/or a power source that provides and/or facilitates a connection to an external source of electrical current.

The communications device 800 includes a graphics processor 820, which may be operable to format and present data that is provided from the control logic 814, the memory 816, and/or other elements of the communications device 800 to the display screen(s) 822. According to embodiments described in more detail above, graphics processor 820 may be operable to adjust the resolution, size, and/or orientation of a graphical presentation based on one or more screen portions being extended or retracted. For example, in a system where there are two screen portions, the graphics processor 820 may present a graphical display on a first screen portion when the second screen portion is retracted. If a second screen portion is extended, the graphics processor 820 may adjust the proportions and/or orientation of the graphical presentation in order to utilize the larger screen space that is provided by the combination of the second screen portion with the first screen portion. In embodiments, such as those depicted by FIGS. 5 and 7, wherein one or more screen portions may be folded in order to be retracted, graphics processor 820 may switch presentation between screens that are provided on opposing surfaces of a screen portion. In embodiments that utilize a single OLED screen, which provides a display at both surfaces of a screen portion (as described above and depicted in FIGS. 6A-C), the graphics processor 820 may switch the orientation of an image based on the direction a screen portion is facing. For example, the graphics processor may display an image in a first orientation when a screen portion is folded in and a first surface of the screen is visible, as depicted in FIG. 7A, and may invert and/or adjust the picture into a second orientation when the screen portion is folded out, as depicted in FIG. 7C. In some embodiments, graphics processor 820 may adjust which screen portions are activated or deactivated based on whether one or more of the screen portions are extended or retracted. Extension or retraction of screen portions may be detected by one or more mechanical or electrical detection devices (e.g., switches), which may be implemented according to desired design criteria.

Figure 9:
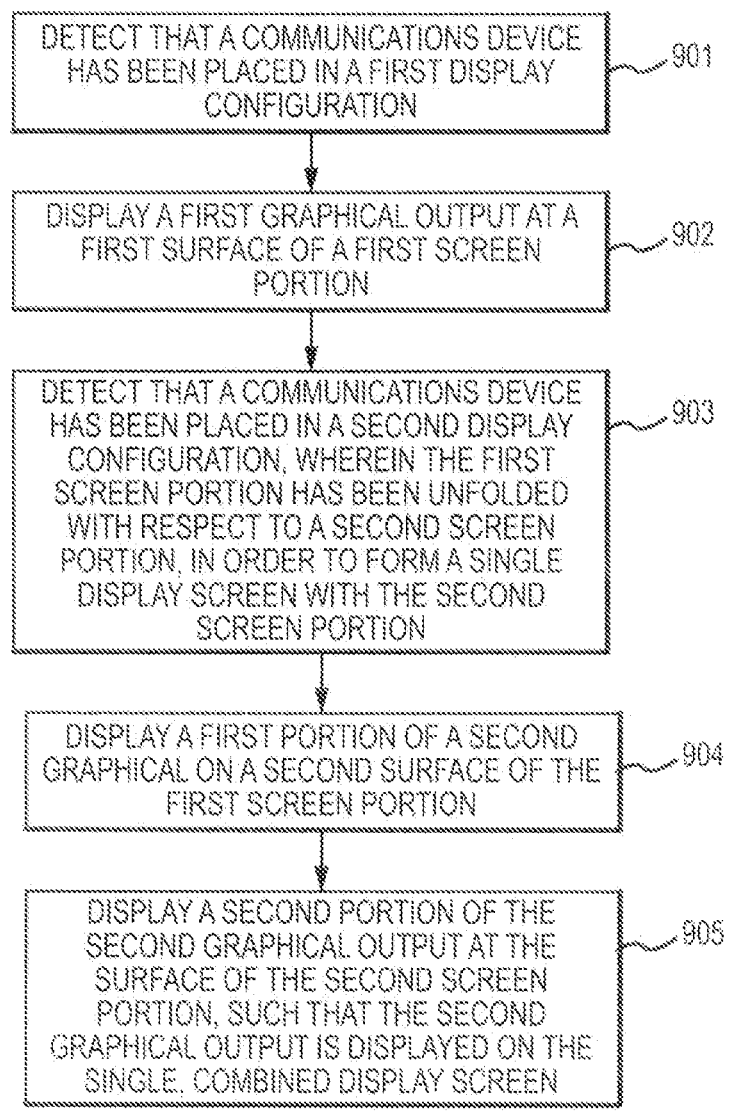
FIG. 9 depicts a flowchart of a method for displaying a graphical output on a communications device, according to one or more embodiments.

FIG. 9 illustrates a flowchart, which depicts a method for displaying a graphical output on a communications device. First, it is detected that a communications device has been placed in a first display configuration (operation 901). In the first display configuration, a first screen portion of the communications device has been folded upon a second screen portion of the communications device. A graphical output from a graphics processor of the communications device is displayed at a first surface of the first screen portion (operation 902). As described above, when the communications device is in the first display configuration, a second surface of the first screen portion may face inwardly toward a surface of the second screen portion. Subsequently, it may be detected that the communications device has been placed in a second display configuration, wherein the first screen portion has been unfolded with respect to the second screen portion in order to form a single display screen with the second portion (operation 903). In this unfolded state, the second surface of the first screen portion, which is opposite the first surface, is in the same plane and is facing the same direction as the surface of the second screen portion in order to form the single display screen. A first portion of a second graphical output is displayed on the second surface of the first screen portion (operation 904). A second portion of the second graphical output is displayed at the surface of the second screen portion, such that the second graphical output is displayed on the single, combined display screen (operation 905).

As described above, the first screen portion may include a single display device, which provides a display that is visible at both the first and the second surfaces of the first screen portion. In some embodiments, this single display device may be a transparent or translucent sheet of material, which provides an OLED display. In some embodiments of the process depicted in FIG. 9, the first graphical output from the graphics processor may be displayed in a first orientation by the first screen portion when the communications device is in the first display configuration. In such an embodiment, when the first screen portion has been unfolded to provide the second (expanded) display configuration, the first orientation of the first screen portion may be inverted by the graphics processor, since the opposite surface of the screen portion is now the surface which is being viewed. Thus, in order to not show a "mirror-image" of graphical output, the graphical orientation may be inverted horizontally in order to correctly display the first portion of the second graphical output in the expanded display configuration.

In the process depicted in FIG. 9, the resolution of the second graphical output may be increased with respect to the first graphical output, in order to utilize the additional screen space provided by the combination of the first screen portion and the second screen portion into the single display screen, when the device is placed in the expanded display configuration. Additionally, the graphical output may be rotated in order to best utilize the newly available screen space and resolution.

Although specific embodiments were described herein, the scope of the invention is not limited to those specific embodiments. The scope of the invention is defined by the following claims and any equivalents therein.

The invention claimed is:

1. A mobile device comprising,
   a display comprising:
   a first display portion;
   a second display portion; and
      wherein the first display portion is viewable while the second display portion is obscured from view when the mobile device is in a retracted configuration;
      wherein the first display portion and the second display portion are viewable when the mobile device is in an expanded configuration;
   a graphics processor, coupled to each of the first display portion and the second display portion, configured to:
   generate a first image for display on the first display portion when the mobile device is in the retracted configuration;
   generate the first image for display on at least one of the first display portion and the second display portion while the mobile device is in the expanded configuration; and
   generate the first image for display on at least one of the first display portion and the second display portion while the mobile device transitions between the retracted configuration and the expanded configuration;
   a third display portion configured to present at least one of the first image and a second image while the mobile device is configured in the expanded configuration;
      wherein the third display portion presents an inverted representation of the first image while the mobile device is configured in the expanded configuration;
   wherein, while the mobile device is configured in the expanded configuration, the graphics processor is configured to:
      expand the first image to occupy a combined area formed by the first display portion and the second display portion; and
   generate a reduced size version of the first image as the inverted representation on the third display portion.

2. The mobile device of claim 1,
   wherein the second display portion further comprises a flexible display material.

3. The mobile device of claim 1,
   wherein each of the first display portion, the second display portion, and the third display portion comprises an organic light emitting diode (OLED) display.

4. The mobile device of claim 3,
   wherein the first display portion and the second display portion comprise a single sheet OLED material.

5. The mobile device of claim 3,
   wherein at least a portion of the OLED display is transparent during at least one of the retracted configuration, the expanded configuration and a transition between the retracted configuration and the expanded configuration.

6. The mobile device of claim 1,
   wherein the first image further comprises at least one of a video and a graphical image.

7. The mobile device of claim 1,
   wherein the second display portion is located within an interior area of the mobile device while the mobile device is in the retracted configuration.

8. The mobile device of claim 1,
   wherein the first display portion and the second display portion form a first display surface.

9. The mobile device of claim 1, further comprising:
   a control logic, coupled to the graphics processor, configured to:
   detect transition of the mobile device between the retracted configuration and expanded configuration; and
   facilitate operations of the mobile device in each of the retracted configuration, the expanded configuration, and during transitions between the retracted configuration and the expanded configuration.

10. The mobile device of claim 9, further comprising:
    at least one detection device, coupled to the control logic, configured to:
    detect when the mobile device is in at least one of retracted configuration, the expanded configuration, and during transition between the retracted configuration and the expanded configuration; and
    communicate a configuration signal indicative thereof to the control logic.

11. The mobile device of claim 1,
    wherein, during the transition, the graphics processor is configured to rotate the first image to occupy a combined screen space provided by the first screen portion and the second screen portion.

* * * * *